Patented Nov. 29, 1932

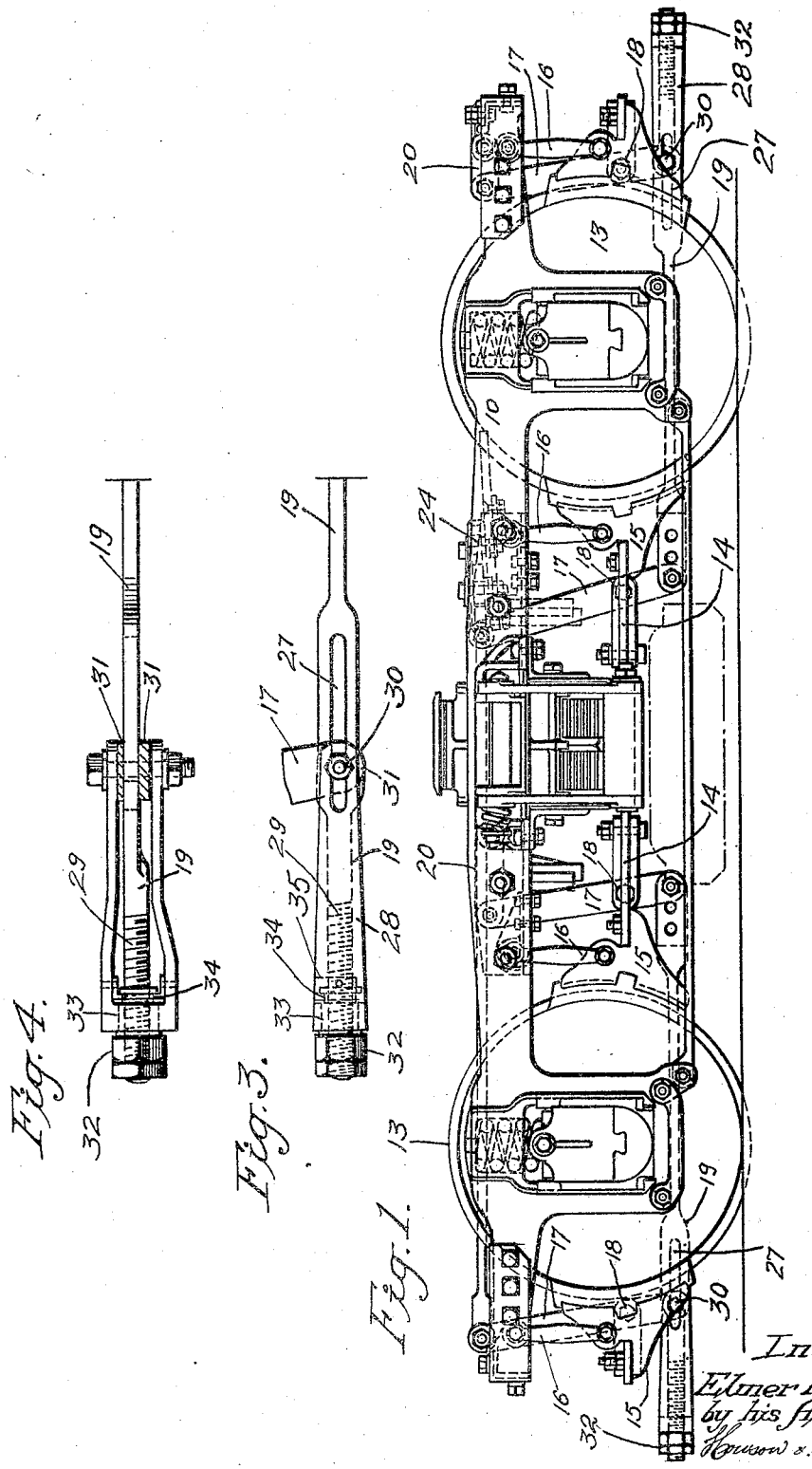

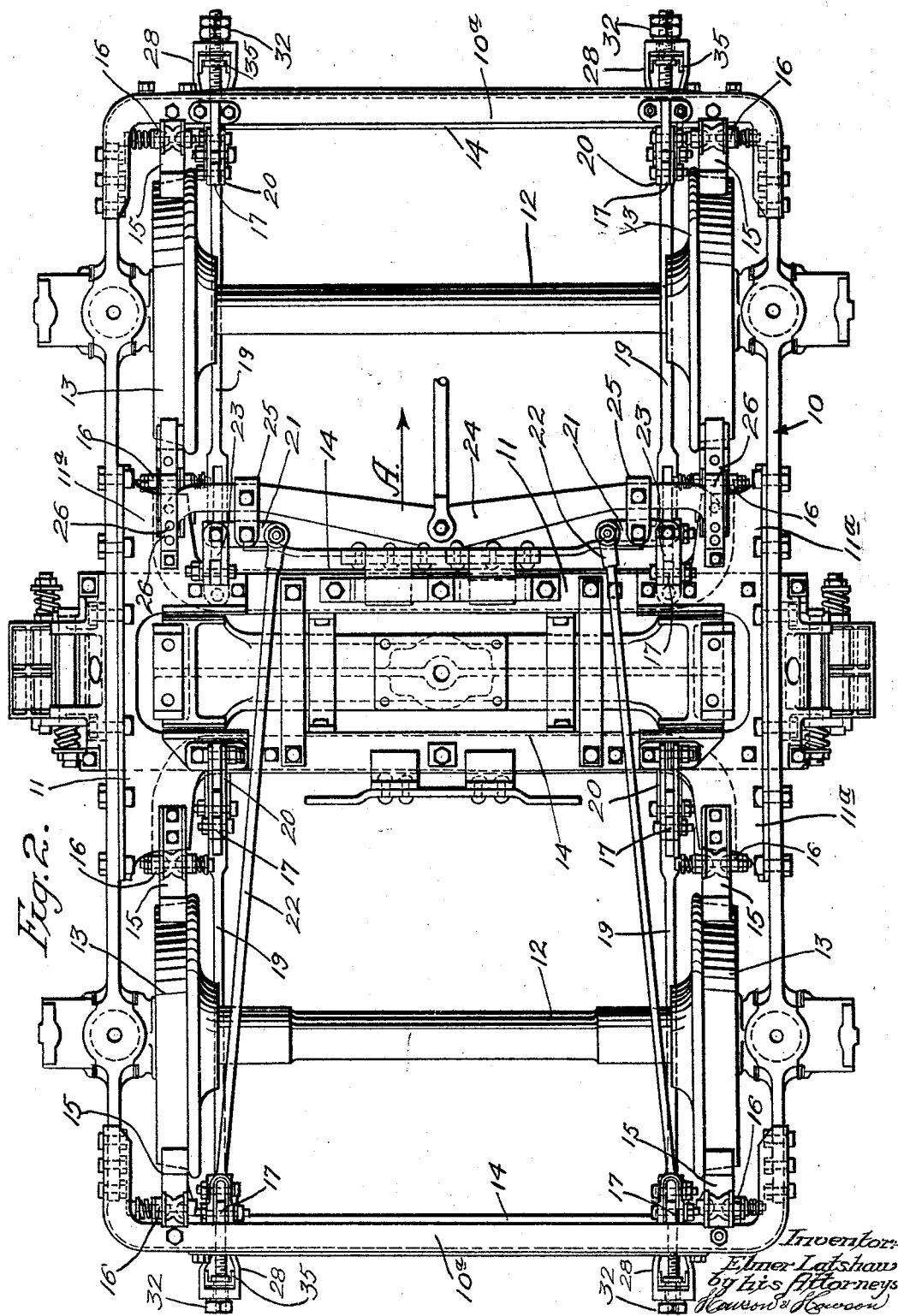

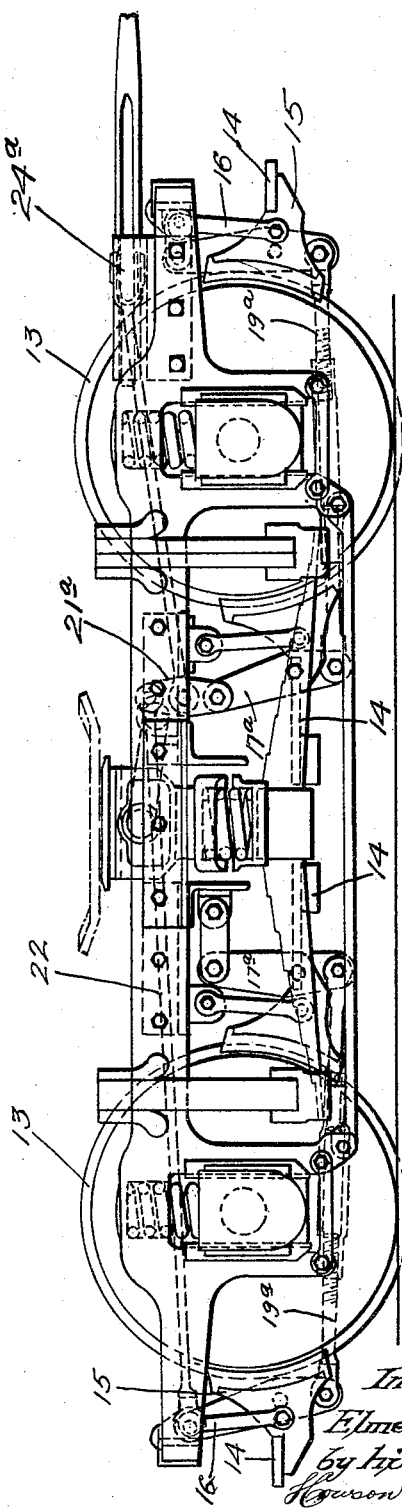

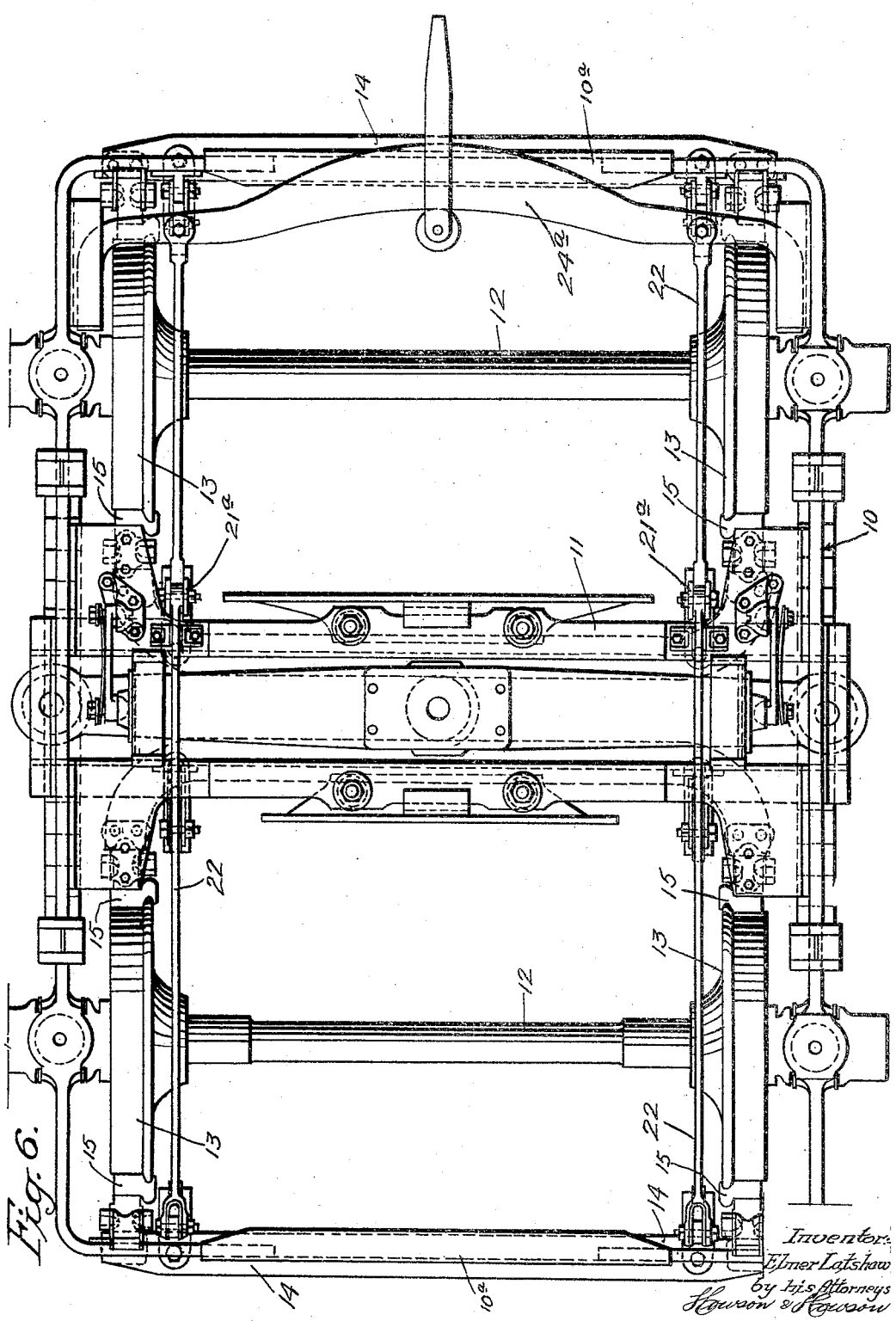

1,889,673

UNITED STATES PATENT OFFICE

ELMER LATSHAW, OF PHILADELPHIA, PENNSYLVANIA, ASSIGNOR TO THE J. G. BRILL COMPANY, OF PHILADELPHIA, PENNSYLVANIA, A CORPORATION OF PENNSYLVANIA

TRUCK BRAKE RIGGING

Application filed May 21, 1931. Serial No. 539,079.

This invention relates to brake riggings for trucks, and more particularly to a clasp type brake rigging.

An important object of the invention is to provide in a construction of this character an arrangement such that equalized braking action may be had upon all of the wheels of the vehicle while at the same time permitting of independent adjustment of the brakes associated with a given wheel.

A still further object of the invention is to provide a rigging of this character lending itself readily to adaptation to standard truck construction.

These and other objects I attain by the construction shown in the accompanying drawings wherein, for the purpose of illustration, I have shown a preferred embodiment of my invention and wherein:

Fig. 1 is a side elevation of a car truck equipped with brake rigging constructed in accordance with my invention;

Fig. 2 is a plan view;

Fig. 3 is an enlarged side elevation of the slack take-up adjustment employed;

Fig. 4 is a plan view thereof;

Fig. 5 is a side elevation showing a slightly modified rigging; and

Fig. 6 is a plan view of the rigging shown in Fig. 5.

Referring now more particularly to the drawings, the numeral 10 generally indicates a truck frame; 11, the central cross member of this frame; 12, axles; and 13, wheels disposed at opposite ends of the axle 12. In accordance with my invention I dispose at opposite sides of each axle, brake beams 14 having brake shoes 15 secured thereto. These beams are supported from the frame 10 through vertically-extending suspension links 16 each preferably engaging the beams through the shoes 15. Associated with each end of each beam is a vertically disposed lever 17 which is pivotally connected to the associated beam at a point adjacent its lower end and indicated at 18. The lower ends of levers 17 which are associated with brake beams at opposite sides of the same axle and are disposed at the same side of the frame are connected to one another by links 19 which are preferably adjustable as to length. One lever of each pair is anchored to the frame at its upper end by horizontally-extending link mechanism 20 while the upper ends of the remaining levers of pairs at the same side of the frame are connected to one another through an equalizer link 21 and drag links 22 and 23. The equalizer bar 21 is connected at its center to a transversely-directed brake bar 24 adjacent one end of this bar through a link 25. The ends of the bar 24 preferably operate in guides 26 carried by the frame 10. Bar 24 may be operated through the usual brake cylinder or manual brake applying mechanism.

It will be obvious that upon movement of the bar 24 in the direction of the arrow "A" of Fig. 2, two of the levers 17 at each side of the truck are caused to approach the associated wheels by direct pull exerted through links 22 and 23. The brake shoes 15 of the associated beam 14 coming into engagement with the wheels check movement of these wheels thereby causing the levers actuated by the links 22, 23 to exert a pull upon the remaining levers of the pairs through the associated links 19, bringing the brakes at the opposite side of the wheel into engagement with the wheel. The pull exerted by the brakes at opposite sides of each wheel will be uniform and it will also be obvious that through the equalizer link 21 the pressure exerted in clasping the brakes of wheels at the same side of the truck will be equalized. Since the pull connected with bar 24 is connected thereto at its center through a pivot, the bar 24 will act as an equalizer mechanism equalizing the brake pressure at opposite sides of the truck. It will be noted that all strain-transmitting connections are made at the inner sides of the wheels 13 and are, accordingly, so located that they will not interfere with manipulation of the wheel in repairing axle boxes, renewing bars, or the like. In this type of construction a frame 10 preferably extends outwardly of the wheels at the sides of the truck, thus enabling mounting of the suspension links 16 in direct alignment with the wheels from the end member 10—a of the truck frame and from wings 11—a formed on opposite ends of the central cross bar 11.

The form of the invention shown in Figs. 5 and 6 differs from that already described in only three particulars. In the construction previously described, the equalizing link 21 is horizontally disposed while in the construction of these figures the equalizing link 21—a is vertically disposed and is directly connected to a lever 17—a of one of the pairs at each side of the truck. The bar 24—a, instead of being disposed at the approximate center of the truck, as in the construction formerly described, is mounted adjacent one end of the truck; furthermore, the type of adjustment employed in links 19—a differs from that illustrated in Figs. 1, 2 and 3.

The preferred type of link adjustment for link 19 which is illustrated in Figs. 1, 2, 3 and 4 is produced by slotting one end of the link as indicated at 27 at a point slightly spaced from such end. A U-shaped yoke 28 is provided, the bight of which has an opening for the passage of the threaded end 29 of the link adjacent this slotted portion and the ends of the arms of this yoke have openings for the passage of a pin 30 which passes through the slot 27 of the link and through eyes formed in the ends of arms 31 produced by bifurcating the lower end of the lever 17 engaging this end of the link. Surrounding the threaded end 29 of the link is a nut 32 having a cylindrical extension 33 rotatably engaging in the opening in the bight of yoke 28 and projecting entirely through this opening. The projecting portion is grooved as at 34 for the reception of a keeper or clip 35 which is pinned to the yoke and thus serves as a means for preventing withdrawal of nut 32. Adjustments of the yoke obtained by operation of nut 32 may be maintained by the usual lock nut.

Since the construction described is obviously capable of a considerable range of change and modification without in any manner departing from the spirit of my invention, I do not wish to be understood as limiting myself thereto except as hereinafter claimed.

I claim:

1. In a car truck clasp brake rigging consisting of brake shoes mounted on each side of each wheel, paired vertical levers at each wheel to apply such brake shoes to the wheel, correspondingly positioned levers of each pair being fulcrumed to the truck frame, a single floating equalizer associated with the remaining levers of said pairs which are disposed at the same side of the truck, said other levers being directly connected to said floating equalizer and an equalizer beam extending transversely of the truck for shifting said floating equalizers.

2. In a car truck clasp brake rigging consisting of a pair of brake shoes disposed at opposite sides of each wheel, a vertical lever located adjacent to and fulcrumed intermediate its ends to each shoe, a rod connecting the lower ends of levers of each wheel set, the upper end of one lever of each wheel set being fulcrumed to the truck frame, a floating equalizer associated with the upper ends of the remaining levers at each side of the truck, said remaining levers at each side of the truck being directly connected to the extremities of said floating equalizer.

ELMER LATSHAW.